(12) United States Patent
Andrews et al.

(10) Patent No.: US 6,287,018 B1
(45) Date of Patent: Sep. 11, 2001

(54) TUNABLE OPTICAL FIBER CONNECTOR

(75) Inventors: Scott R. Andrews, Dacula; Norman Roger Lampert, Norcross; Robert Wayne Mock, Lawrenceville; Gregory A. Sandels, Buford; Naif Taleb Subh, Lawrenceville, all of GA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/363,906

(22) Filed: Jul. 28, 1999

(51) Int. Cl.[7] ............................................. G02B 6/38
(52) U.S. Cl. ........................ 385/60; 385/56; 385/62; 385/66; 385/72; 385/76; 385/77; 385/78; 385/81; 385/84; 385/86; 385/139
(58) Field of Search ................................. 385/56, 60, 62, 385/66, 72, 76–78, 81, 84, 86, 87, 139

(56) References Cited

U.S. PATENT DOCUMENTS

| | | | |
|---|---|---|---|
| 4,375,012 | 2/1983 | Cocco et al. | 174/69 |
| 4,738,507 | 4/1988 | Palmquist | 350/96.21 |
| 4,787,698 | 11/1988 | Lyons et al. | 350/96.2 |
| 4,793,683 | 12/1988 | Cannon, Jr. et al. | 350/96.21 |
| 4,934,785 | 6/1990 | Mathis et al. | 350/96.21 |
| 5,146,525 | 9/1992 | Tabone | 385/78 |
| 5,212,752 | 5/1993 | Stephenson et al. | 385/78 |
| 5,274,729 | 12/1993 | King et al. | 385/134 |
| 5,390,269 | 2/1995 | Palacek et al. | 385/78 |
| 5,481,634 | 1/1996 | Anderson et al. | 385/76 |
| 5,638,474 | 6/1997 | Lampert et al. | 385/78 |
| 5,946,436 | 8/1999 | Takashi | 385/60 |
| 6,102,581 | * 8/2000 | Deveau et al. | 385/56 |

FOREIGN PATENT DOCUMENTS

| | | |
|---|---|---|
| 4041 425 A 1 | 7/1992 | (DE) . |
| 42 03 966 A 1 | 8/1992 | (DE) ............... G02B/6/36 |

OTHER PUBLICATIONS

Shiyuuichi—Patent Abstracts of Japan—vol. 1999, No. 05—JP 11038276 (Feb. 12, 1999).
Horonori—Patent Abstracts of Japan—vol. 009, No. 120—JP 60006909 (Jan. 14, 1985).

* cited by examiner

*Primary Examiner*—Cassandra Spyrou
*Assistant Examiner*—Craig Curtis
(74) *Attorney, Agent, or Firm*—Thomas, Kayden, Horstemeyer & Risley, LLP

(57) ABSTRACT

An optical fiber connector that is tunable despite being fully assembled has a assembly having an enlarged ferrule holding member or flange that has a multi-faceted periphery, preferably in the shape of a hexagon. The connector has a front housing portion that has a multi-faceted seating region for the flange. The flange is disengageable from the seating region for tuning rotation by being movable axially toward the rear of the housing against the force of a spring. The connector can be tuned by incremental rotations of the assembly when the flange is disengaged.

15 Claims, 11 Drawing Sheets

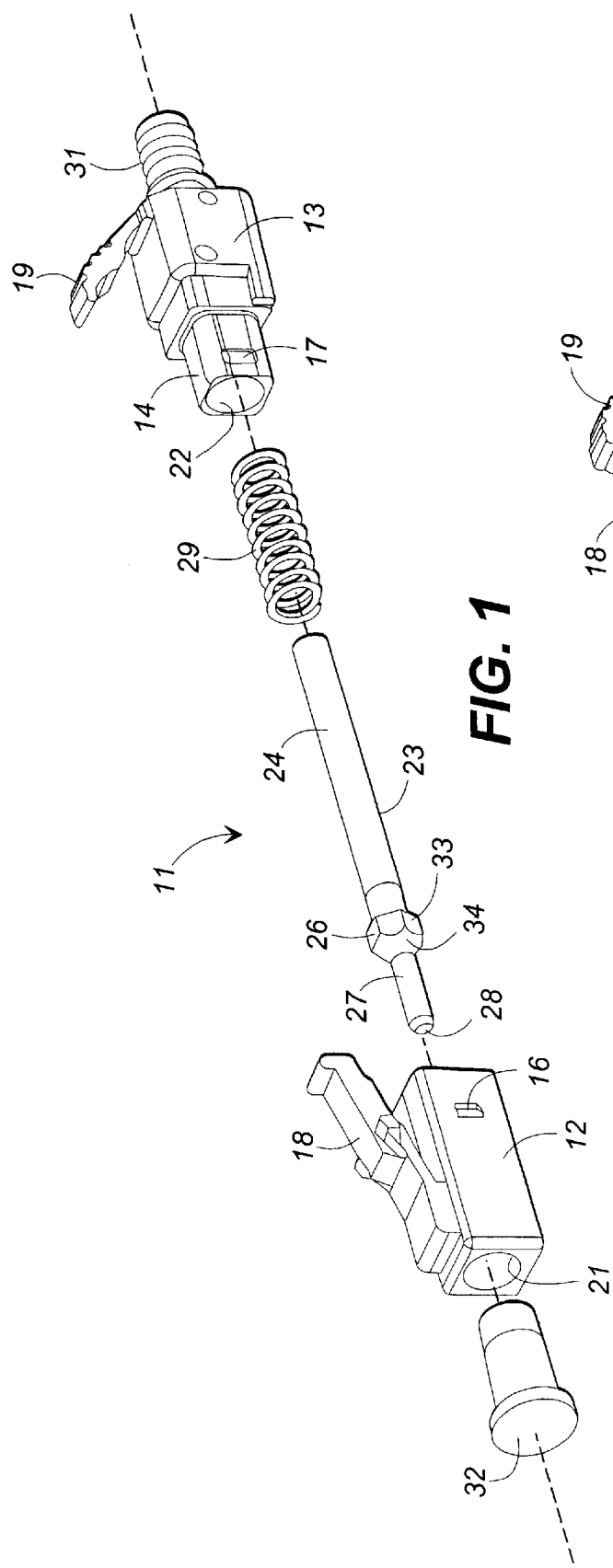
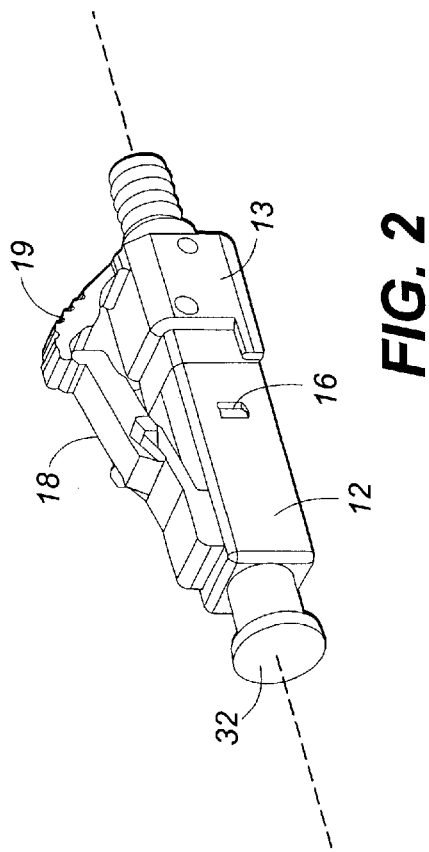

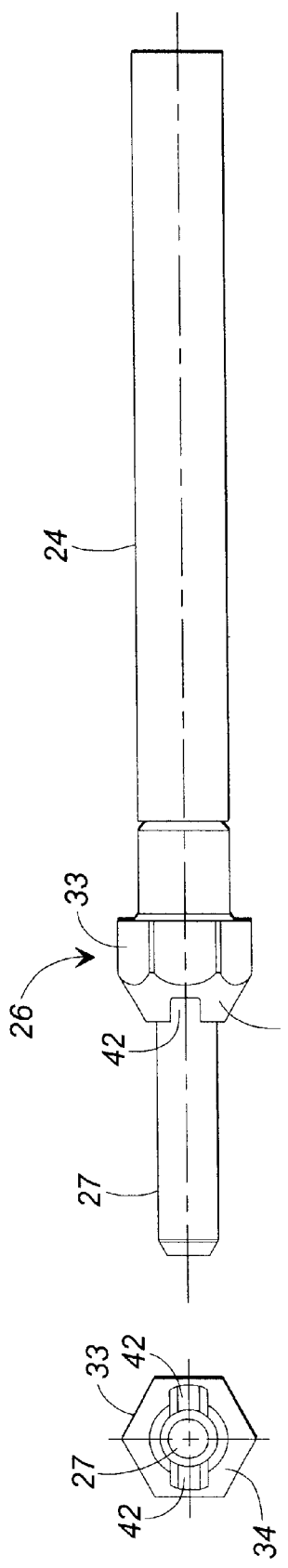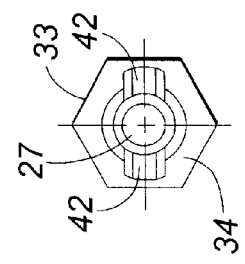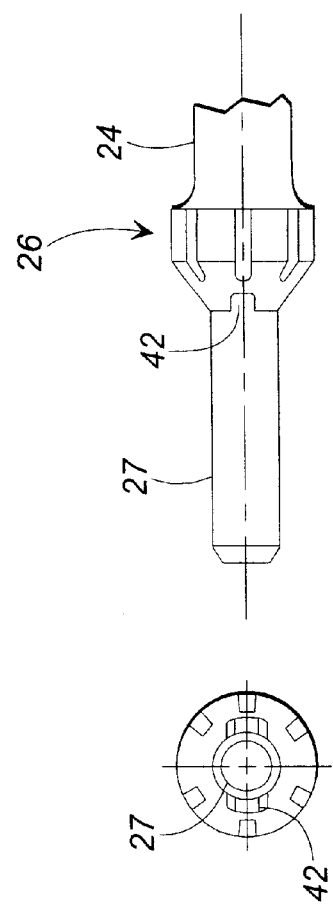

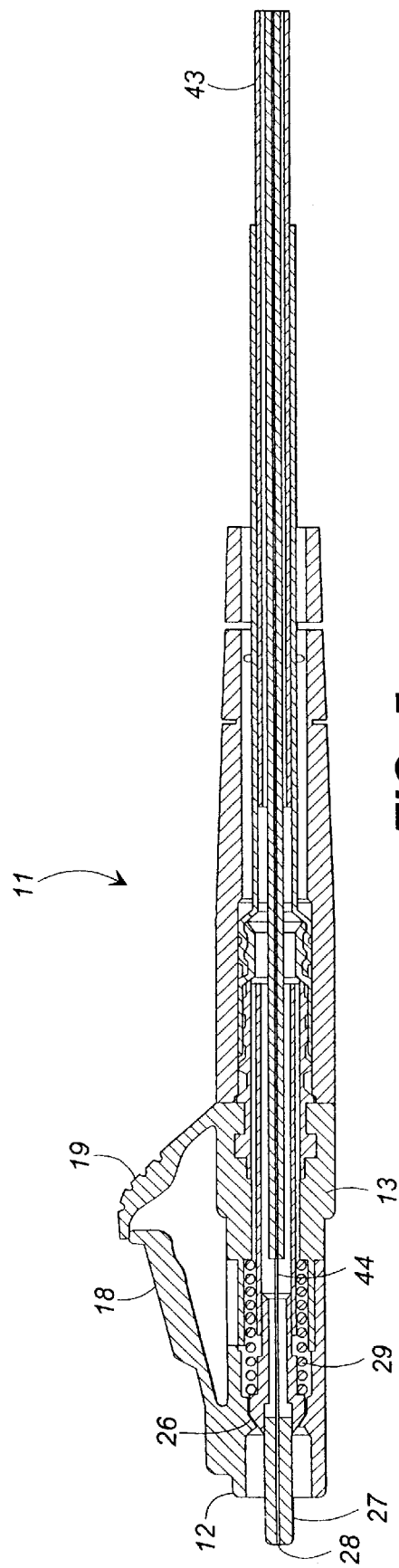
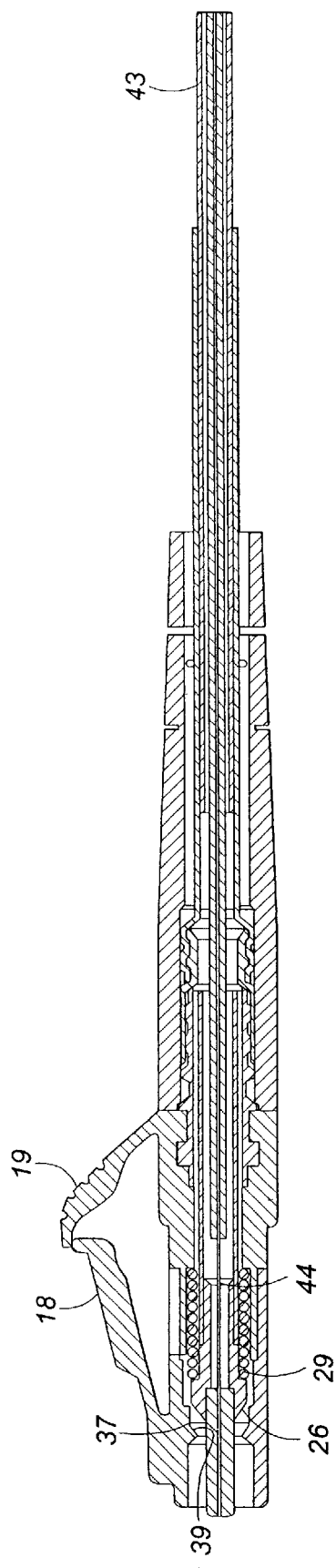
FIG. 5a
FIG. 5b

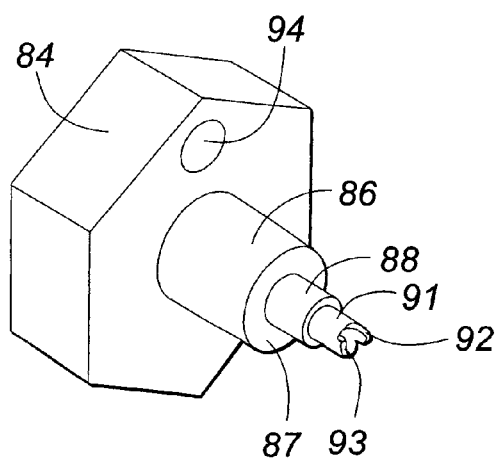
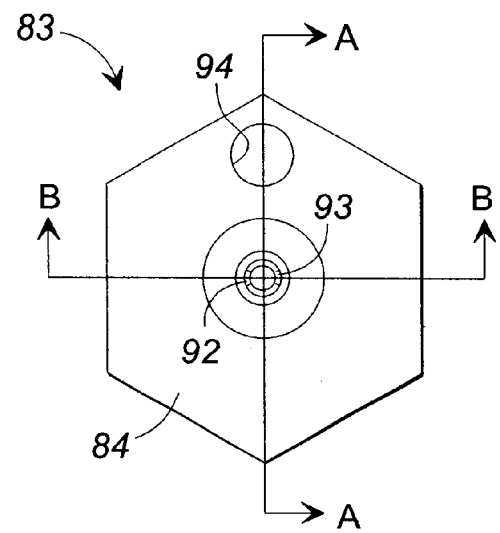
FIG. 14a  FIG. 14b
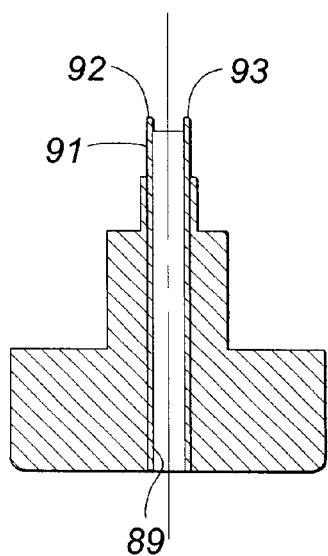
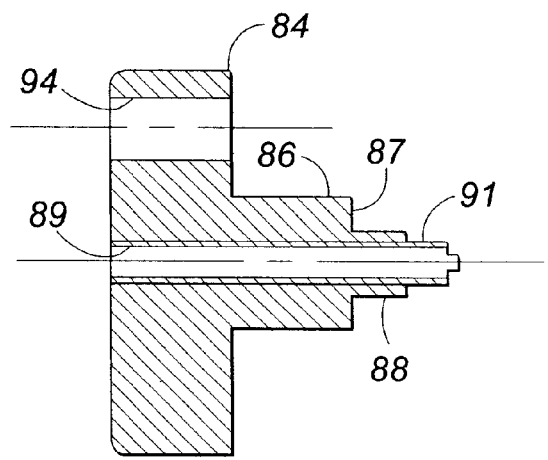
FIG. 14c  FIG. 14d

TUNABLE OPTICAL FIBER CONNECTOR

RELATED APPLICATIONS

This application is related to U.S. patent application Ser. No. 09/363,908 and Ser. No. 09/362,203, both filed concurrently herewith.

FIELD OF THE INVENTION

This invention relates to an optical fiber connector and, more particularly to a to tunable optical fiber connector.

BACKGROUND OF THE INVENTION

In optical fiber communications, connectors for joining fiber segments at their ends, or for connecting optical fiber cables to active or passive devices, are an essential component of virtually any optical fiber system. The connector or connectors, in joining fiber ends, for example, has, as its primary function, the maintenance of the ends in a butting relationship such that the core of one of the fibers is axially aligned with the core of the other fiber so as to maximize light transmissions from one fiber to the other. Another goal is to minimize back reflections. Such alignment is extremely difficult to achieve, which is understandable when it is recognized that the mode field diameter of, for example, a singlemode fiber is approximately nine (9) microns (0.009 mm). Good alignment (low insertion loss) of the fiber ends is a function of the alignment, the width of the gap (if any) between the fiber ends, and the surface condition of the fiber ends, all of which, in turn, are inherent in the particular connector design. The connector must also provide stability and junction protection and thus it must minimize thermal and mechanical movement effects.

In the present day state of the art, there are numerous, different, connector designs in use for achieving low insertion loss and stability. In most of these designs, a pair of ferrules (one in each connector), each containing an optical fiber end, are butted together end to end and light travels across the junction. Zero insertion loss requires that the fibers in the ferrules be exactly aligned, a condition that, given the necessity of manufacturing tolerances and cost considerations, is virtually impossible to achieve, except by fortuitous accident. As a consequence, most connectors are designed to achieve a useful, preferably predictable, degree of alignment, some misalignment being acceptable.

Alignment variations between a pair of connectors are the result of the offset of the fiber core centerline from the ferrule centerline. This offset, which generally varies from connector to connector, is known as "eccentricity", and is defined as the distance between the longitudinal centroidal axis of the ferrule at the end face thereof and the centroidal axis of the optical fiber core held within the ferrule passage and is made up of three vectors. It is often the case, generally, that the ferrule passage is not concentric with the outer cylindrical surface of the ferrule (vector I), which is the reference surface. Also, the optical fiber may not be centered within the ferrule passage (vector II whose magnitude is the diametrical difference divided by two) and, also, the fiber core may not be concentric with the outer surface of the fiber (vector E). Hence eccentricity can be the result of any one or all of the foregoing. The resultant eccentricity vector has two components, magnitude and direction. Where two connectors are interconnected, rotation of one of them will, where eccentricity is present, change the relative position of the fibers, with a consequent increase or decrease in the insertion loss of the connections. Where the magnitude of the eccentricities are approximately equal the direction component is governing, and relative rotation of the connectors until alignment is achieved will produce maximum coupling.

There are numerous arrangements in the prior art for "tuning" a connector, generally by rotation of its ferrule, to achieve an optimum direction of its eccentricity. One such arrangement is shown in U.S. Pat. No. 5,481,634 of Anderson et al., wherein the ferrule is held within a base member which maybe rotated to any of four rotational or eccentricity angular positions. In U.S. Pat. No. 4,738,507 of Palmquist there is shown a different arrangement and method for positioning two connectors relative to each other for minimum insertion loss or maximum coupling. The arrangements of these patents are examples of the efforts to achieve optimum reliable coupling, there being numerous other arrangements and methods.

In all such arrangements for achieving optimum coupling with connectors having different magnitudes and directions of eccentricities, the tuning takes place, usually, if not always prior to the final assembly of the connector. As a consequence, an installer in the field has no control over the degree of coupling, other than by trial and error. Further, tuning of the connector cannot be performed after production of the connector is completed. Thus tuning prior to final assembly of the conductor is a step in the production process.

An optical fiber connector that can be tuned for optimum performance after the connector has been assembled would greatly decrease production costs and further, impart a greater measure of reliability to the connectors. Such a connector would be of significant commercial value.

SUMMARY OF THE INVENTION

The present invention is a connector for abutting one optical fiber to another, and which is tunable for achieving maximum possible signal transmissivity or minimum insertion loss despite being fully assembled. In a preferred embodiment of the invention the principles thereof are illustrated in a connector of the LC type for single mode fibers. It is to be understood that the principles of the invention are applicable to numerous other types of connectors such as, for example, the SC, FC and ST type connectors, as well as to other fiber optic type devices.

The connector of the invention, which, for purposes of illustration is a modified LC type connector, has the basic components such as are shown in U.S. Pat. No. 5,481,634 of Anderson et al., the disclosure of which is incorporated by reference herein.

The basic components of such a connector as shown in the Anderson et al. patent comprises a assembly for holding the end of an optical fiber extending axially therethrough and a plug housing member which contains the assembly. A coil spring member contained within the housing surrounds the barrel and bears against an interior wall of the housing and an enlarged barrel member or flange, thereby supplying forward bias to the barrel-ferrule assembly relative to the housing. The barrel member, referred to as a flange in the Anderson et al. patent, is shaped to be supported within an interior cavity within the housing in any one of four rotational orientations with respect to the central axis of the fiber holding structure. A ferrule extends axially from the enlarged barrel member and contains a fiber end therein. Thus the direction of eccentricity of the fiber relative to the central axis can have any one of four rotational or angular orientations. The connector is "tuned" to the extent that four orientations are possible. However, the "tuning" is a manufacturing step preceding final assembly of the connector, after which it is no longer "tunable".

In accordance with the present invention, the barrel-ferrule assembly of the connector is modified so that the enlarged barrel member is optimally hexagonal in shape, and has a tapered or chamfered leading surface which may be slotted. The housing is also modified so that the interior cavity is hexagonal in shape to accommodate the barrel member in any of six rotational orientations and a sloped constriction against which the leading surface bears in its forward position. Tuning of the fully assembled connector is accomplished by the application of an axial force to the barrel member, as by a spanner wrench fitted within the slots in the leading surface, sufficient to overcome the bias of the coil spring and to push the barrel portion rearwardly out of engagement with the hexagonally shaped recess in the housing and the sloped constriction. The assembly is then rotatable to any of six angular orientations, sixty degrees (60°) apart. It should be noted that a lesser number of surfaces can be used if the diagonal distance of the barrel cross-section is reduced sufficiently to allow rotation thereof within the plug housing. Alternatively, the bore containing the flange may have an increased diameter, but this tends to weaken the housing walls. Fewer surfaces, however, means larger increments of rotation and hence less precise reduction in loss. Also, more than six surfaces may be used, however, the improvement over six surfaces is slight and the clearance surrounding the barrel makes limiting rotation within the housing difficult to achieve.

The connector may be mated with another connector having a known offset, for example, and insertion loss measurements made after each incremental rotation. When the angular position yielding the least loss is determined, the ferrule-barrel assembly is rotated to that position.

An indexable tuning test tool having a spring loaded split LC adapter that is keyed and labeled to measure the optical performance of an LC connector at six different angular orientations is designed for use in determining the degree of tuning of the connector that is necessary. The tool has a longitudinal split ceramic sleeve therein for aligning two LC connector end faces. In operation, a test jumper cable having an LC connector which has an eccentricity of a magnitude greater than that of the connector to be tuned and a known direction (angular orientation), is inserted into the sleeve and the production jumper connector is fitted into the sleeve so that the connector ferrule ends abut. The opposite end of the jumper cable is connected to an optical source, or an optical detector, and the production jumper is connected to a source or detector to complete a test circuit. Ideally, the test jumper has an eccentricity of 1.8 to 3.5 $\mu$m relative to the ferrule axis, and has an angular orientation of zero degrees (0°) or one hundred eighty degrees (180°), preferably the former which is an upright vertical orientation. Insertion loss measurements are then taken and the initial loss is noted. The portion of the tool holding the product jumper is spring loaded to allow separation of the fiber end faces and rotation thereof. The tool is thus rotated in sixty degree (60°) increments, with measured insertion loss being recorded at each increment. The angular orientation of the product jumper that yields minimum insertion loss is thus determined. The labeling on the tool indicates how many degrees, in sixty degree increments, the product jumper had to be rotated to produce minimum insertion loss. Inasmuch as the angular orientation of the connector of the test jumper is known, preferably, as stated hereinbefore, zero degrees (0°) or straight up or vertical, the tool indicates how many incremental stages the product jumper requires to have a corresponding vertical orientation. It is also feasible to ascertain, instead of minimum insertion loss, the angular orientation for maximum insertion loss. Rotation of 180° from this orientation yields the orientation for minimum insertion loss. In both methods, one or the other of the extremes of insertion loss is determined.

As an adjunct of the tuning test operation, a tool used for tuning in the form of a spanner wrench is designed to tune the product connector on the basis of the test results. The tuning tool wrench comprises an enlarged handle shaped, such as hexagonally, for gripping from which extends a hollow sleeve having a distal end with first and second tangs extending therefrom. The sleeve is adapted and sized to fit over the ferrule of the product jumper connector with the tangs engaging the slots in the leading or front surface of the barrel member. In use, the tangs are engaged and the assembly is pushed to the rear out of engagement with the plug housing and against the spring bias, so that the assembly may be rotated the required number of degrees as indicated by the tuning index tool to the angular orientation yielding minimum insertion loss where the connector is mated with another connector having vertical orientation of its eccentricity. The spanner wrench has a shoulder from which the sleeve extends, which butts against the housing to limit the insertion distance of the wrench. The distance from the face of the shoulder to the tangs is chosen such that the assembly, when pushed against the coil spring, does not cause the spring to bottom, which can be damaging to the spring. The barrel is then rotated to the tuned position. When the wrench is removed, the spring returns the barrel forward to its new rotated seating position. In this manner, the product connector is tuned. It is contemplated that all mating connections will have such a vertical orientation, hence the installer, for example, does not have to be concerned with optimum tuning.

Thus the unique structure of the connector permits tuning of the assembled connector. Further, the tuning tool enables additional rotations of the assembly when desired, for whatever reason.

DESCRIPTION OF THE DRAWINGS

FIG. 1 is an exploded perspective view of the components of the connector;

FIG. 2 is a perspective view of the assembled connector;

FIG. 4a is a side view of a modified ferrule-barrel member of the connector;

FIG. 4b is a front elevation view of the member of FIG. 4a;

FIG. 4c is a side elevation view of a modification of the ferrule-barrel assembly of FIG. 1 or FIG. 4a;

FIG. 4d is a front elevation view of the assembly of FIG. 4c;

FIG. 5a is a side elevation cross-sectional view of the connector;

FIG. 5b is a side elevation cross-sectional view of the connector in its tuning configuration;

FIG. 14a is a perspective view of the tuning wrench of the invention for tuning a connector;

FIG. 14b is a front elevation view of the wrench of FIG. 14a;

FIG. 14c is a cross-sectional view of the wrench of FIG. 14b along the line B—B;

FIG. 14d is a cross-sectional view of the wrench of FIG. 14b along the line A—A;

DETAILED DESCRIPTION

Figure 3A:
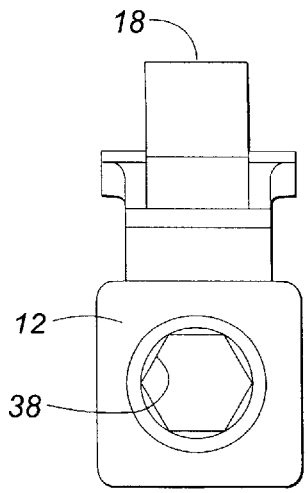
FIG. 3a is a front elevation view of the connector housing, front portion.

FIG. 1 is an exploded perspective view of the principal components of an LC type connector 11 which embodies the principles of the present invention. It is to be understood that these principles are also applicable to other types of connectors, such as an ST, SC, or others amenable to modification to incorporate these principles. Connector 11 comprises a plug housing formed of a front section 12 and a rear section 13 having an extended portion 14 which fits into section 12 and latches thereto by means of slots 16—16 in front section 12 and latching members 17—17. Members 12 and 13 are preferably made of a suitable plastic material. Member or front section 12 has a resilient latching arm 18 extending therefrom for latching the connector 11 in place is a receptacle or adapter. Member or section 13 has extending therefrom a resilient arm or trigger guard 19, the distal end of which, when the two sections 12 and 13 are assembled, overlies the distal end of arm 18 to protect it from snagging and to prevent nearby cables from becoming entangled. Usually latch arm 18 and guard 19 are molded with their respective housing sections 12 and 13, respectively, and form "living hinges" therewith, which enable them to be moved up and down between latching and unlatching positions. Front section 12 has a bore 21 extending therethrough which, when the parts are assembled, is coextensive with a bore 22 extending through rear section 13. The bores 21 and 22 accommodate a assembly 23 which comprises a hollow tubular member 24 having a ferrule holding apparatus shown here as an enlarged flange or barrel member 26 from which extends a ferrule 27 which may be made of a suitably hard material such as, preferably, ceramic, glass, or metal. Ferrule 27 has a bore 28 extending therethrough for receiving and holding an optical fiber therein. When the connector 11 is assembled, a coil spring 29 surrounds the tubular portion 24 of the assembly 23, with one end bearing against the rear surface of flange 26 and the other end bearing against an interior shoulder in rear section 13, as will best be seen in subsequent figures.

In practice, the uncoated portion of the optical fiber is inserted into bore 28 of ferrule 27 and adhesively attached thereto. Spring 29 is compressed as the sections 12 and 13 are connected and supplies a forward bias against the rear of flange 26 and, hence, to ferrule 27. This arrangement of ferrule 27 and spring 29 is considered to be a "floating" design. Prior to connection, the spring 29 causes ferrule 27 to overtravel its ultimate connected position. When connector 11 is connected within a suitable adapter and the distal end of ferrule 27 butts against the corresponding ferrule end of another connector or of other apparatus, spring 29 will be compressed, thereby allowing backward movement of ferrule 27 to where its end, and the end of the abutting ferrule, lie in the optical plane (transverse centerline) between the two connectors.

The rear end of rear section 13 has a ridged member 31 extending therefrom for attachment of optical fiber cable and a strain relief boot, not shown,. For protection of the distal end of ferrule 27 during handling and shipping, a protective plug 32, sized to fit within bore 21, is provided. FIG. 2 depicts the assembled connector 11 in its shipping or handling configuration.

Figure 3B:
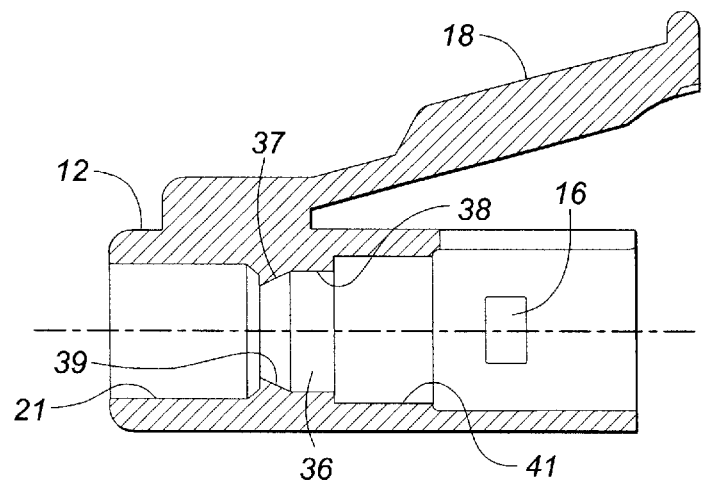
FIG. 3b is a cross-sectional side elevation view of the front portion.
Figure 3C:
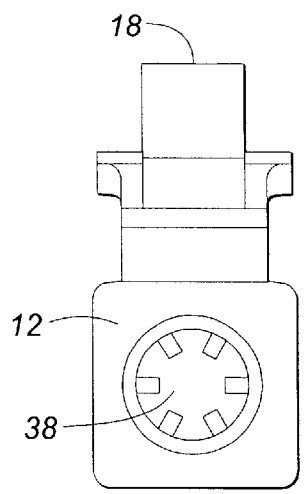
FIG. 3c is a front elevation view of the connector housing first portion, adapted to receive the ferrule-barrel assembly of FIGS. 4c and 4d.

In accordance with the present invention, as best seen in FIGS. 4a and 4b, flange 26 has a hexagonally shaped portion 33 and a front tapered portion 34 which can be tapered extension of the hexagon shape. While the following discussion relates to a multi-faceted ferrule holding member, it is to be understood that the term "faceted" is intended to include other locating arrangements such as, for example, slots or splines. Front section 12 has a flange seating opening 36 formed in a transverse wall 37 thereof which has a hexagonally shaped portion 38 and a tapered portion 39 dimensioned to receive and seat flange 26, as best seen in FIGS. 3a and 3b. In FIG. 3c, the opening 36 has instead of a hexagonal shape, a plurality of splines 40 extending inwardly therefrom, a modification especially adapted to receive the ferrule-barrel assembly of FIGS. 4c and 4d. That portion 41 of bore 21 immediately to the rear of portion 38 has a diameter sufficient to allow rotation of flange 26 when it is pushed to the rear and disengaged from the seat 36. Thus, as will be discussed more fully hereinafter, when flange 26 is pushed to the rear (against the force of spring 29) it may be rotated and, when released, re-seated with tapered portion 34 acting as a guide and centering arrangement. The hexagonal configuration makes it possible to seat the flange 26 in any of six angular rotational positions, each sixty degrees (60°) apart. It has been found that a flange having fewer than six sides cannot be rotated in the assembled connector unless the diameter of bore portion 41 is increased because the diagonal of a four sided flange is too great for rotation of the flange. However, increasing the diameter of portion 41 seriously weakens the walls of the housing section 12. Further, in the tuning of the connector it has been found that six sides gives a more accurate tuning for reduction of insertion loss. The use of a flange with more than six sides is possible, and gives an even greater tuning accuracy by creating smaller increments of rotation. However, the increased accuracy is not sufficiently great to justify the increased difficulty in achieving a stable and firm seating of the flange. As the number of flange sides is increased, the periphery thereof approaches a circular configuration, which would possibly be rotatable even when seated. As a consequence, it has been found that a six sided flange is optimum.

FIGS. 4a and 4b show a modification of a barrel-ferrule assembly 23 in which the sloped or tapered portion 34 has a notch 42 therein for accommodating a tuning tool, not shown.

FIGS. 5a and 5b depict, in cross-section, the connector 11 of the present invention showing, in FIG. 5a, the flange seated position and in FIG. 5b, the disengaged and rotatable position of the flange for tuning, demonstrating how tuning is achievable with a fully assembled connector. It should be noted that the thickness of the wall 37 is slightly less than that of flange 26, thereby insuring that flange 26 can be disengaged (pushed back) from the seat 36 to where it can be rotated without causing spring 29 to bottom. Connector 11 is shown mounted on the end of a cable 43 containing a fiber 44, which extend through connector 11 as shown.

Figure 6:
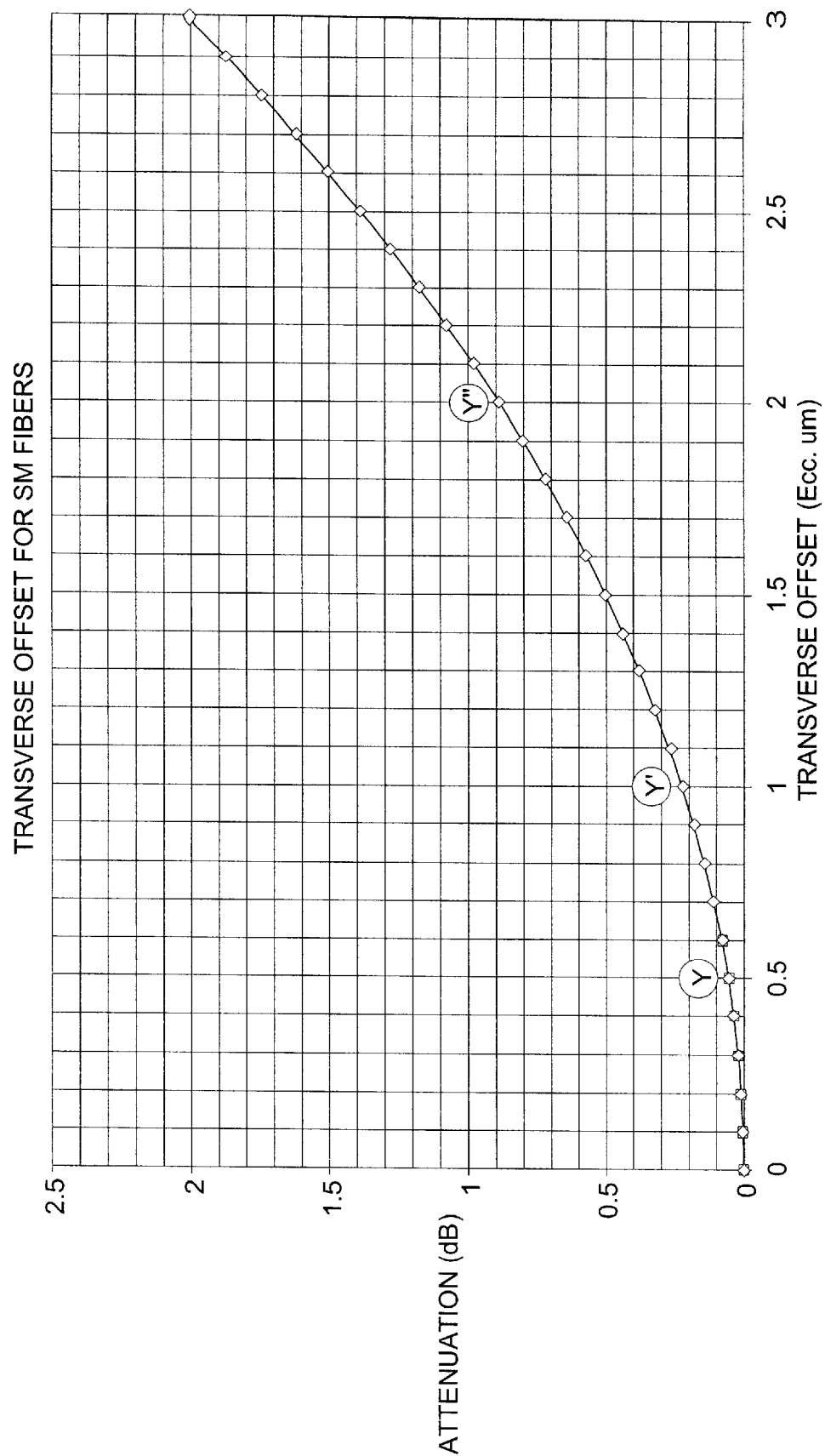
FIG. 6 is a graph of the effect of offset between two fiber ends.

FIG. 6 is a graph of the effect of offset between two fiber ends (two connectors) which is "transverse offset" versus attenuation. For very small offsets, such as 0.5 microns (point Y), the loss is corresponding small, about 0.05 dB. In the range from zero offset to one micron (point Y'), the loss remains well below 0.3 dB, which is a preferred limit on loss. The next increment range of offset, from one micron to two microns (point Y") shows an exponential increase in loss, from about 0.22 dB to 0.9 dB. Thus, it can be seen that for each incremental increase of one micron offset, the loss increases exponentially. It can be appreciated therefore, that tunability of the connector to decrease the offset between the two fiber ends is highly desirable.

Figure 7:
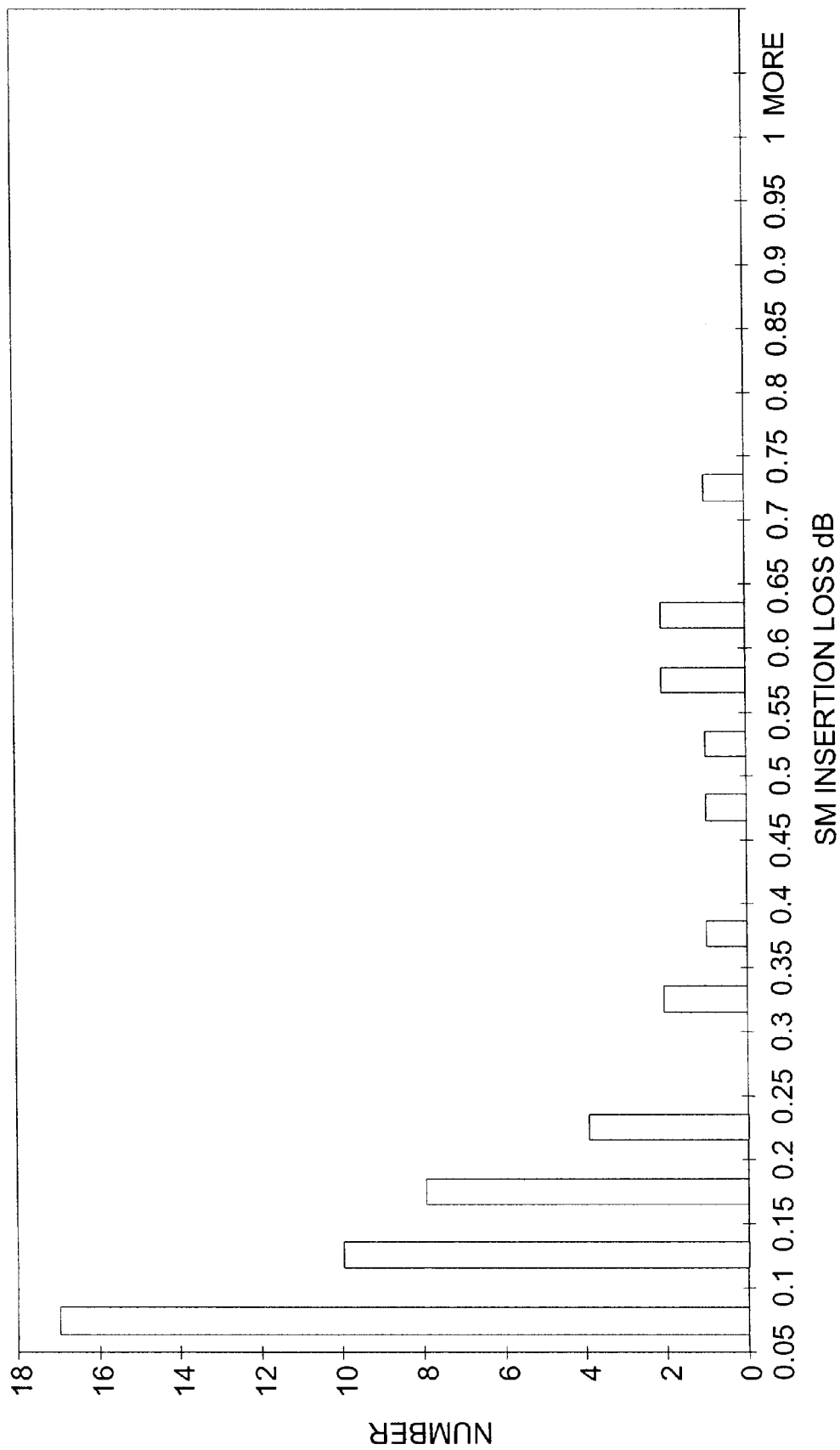
FIG. 7 is a bar chart of the distribution of insertion loss for untuned connectors.
Figure 8:
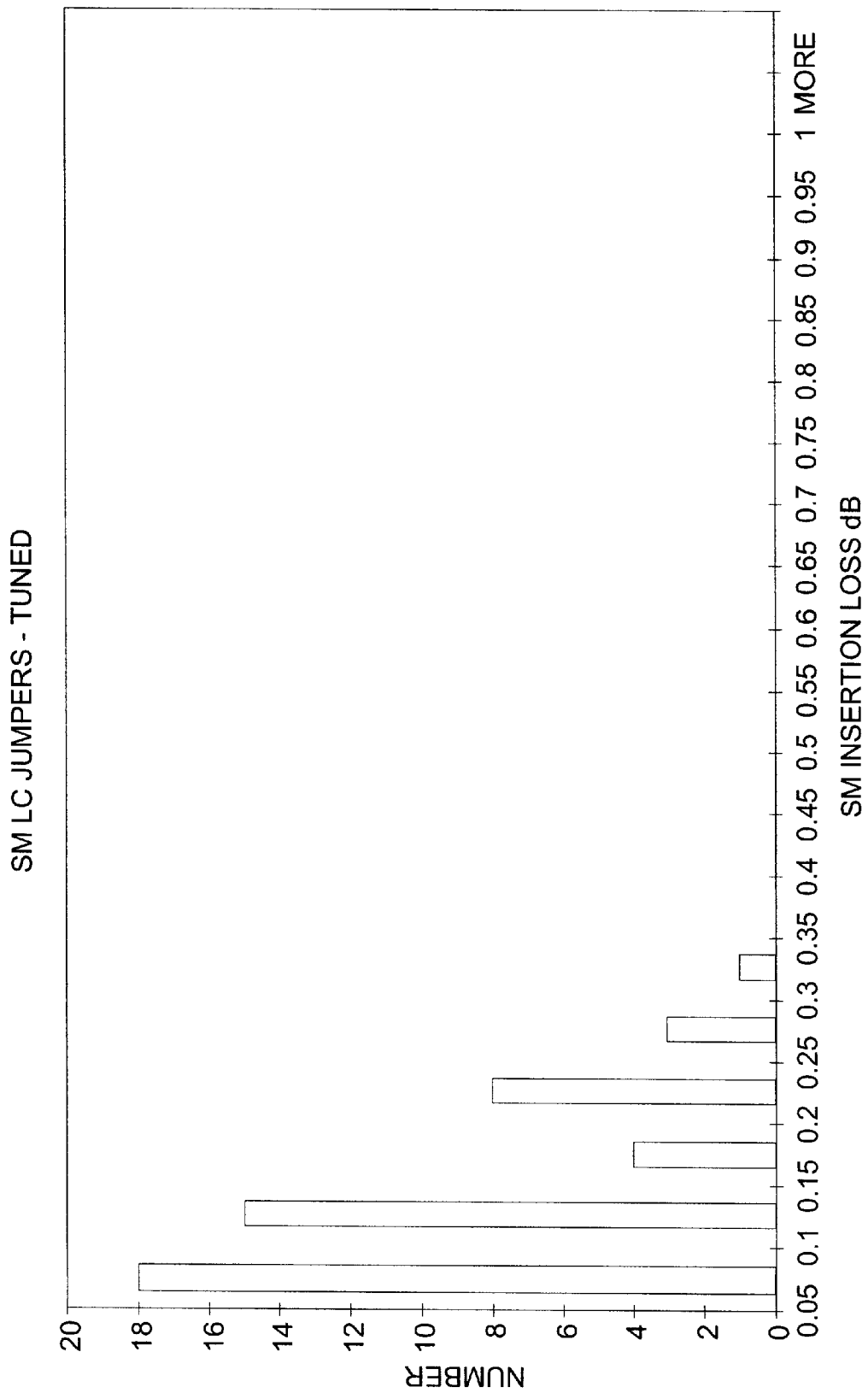
FIG. 8 is a bar chart of the distribution of insertion loss for tuned connectors.

FIG. 7 is a bar chart of the measurements on a group of untuned connectors showing a wide distribution of insertion loss. It can be seen that several of the connectors exceed the preferred insertion loss limit of 0.3 dB. FIG. 8 is a bar chart of the same group of connectors after tuning, showing a compression of the loss distribution to where only one connector exceeds the 0.3 dB limit. Thus, from FIGS. 7 and 8, it can be seen that tuning materially enhances the performance of connectors where there are eccentricities present, which is virtually always the case.

Tuning Index Tool

Figure 9:
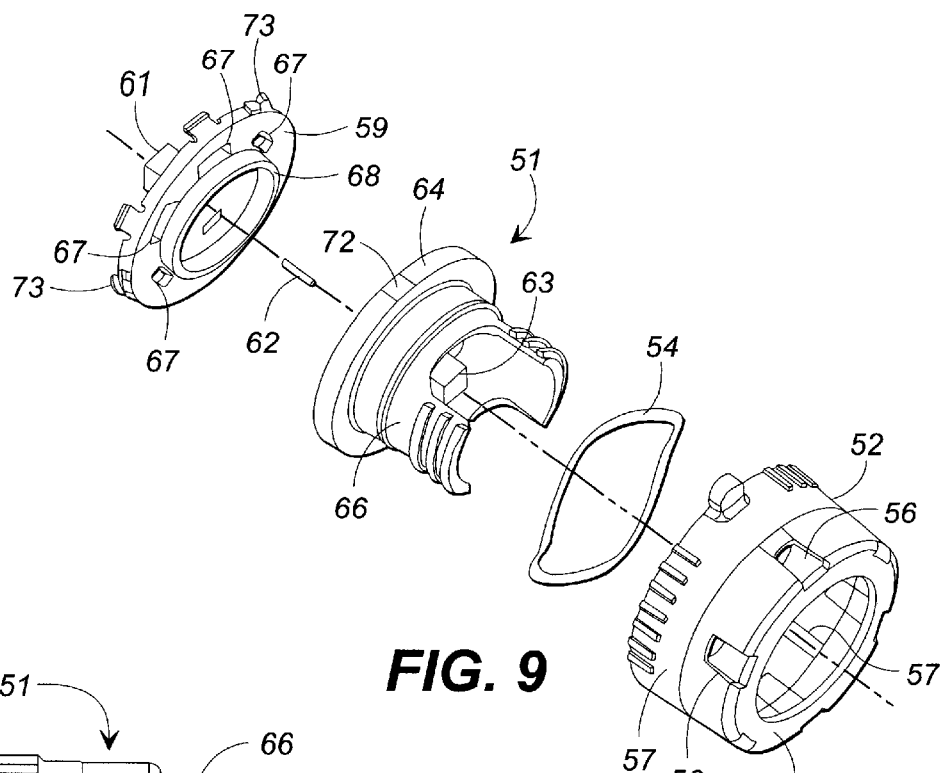
FIG. 9 is an exploded perspective view of a tuning index tool.
Figure 10:
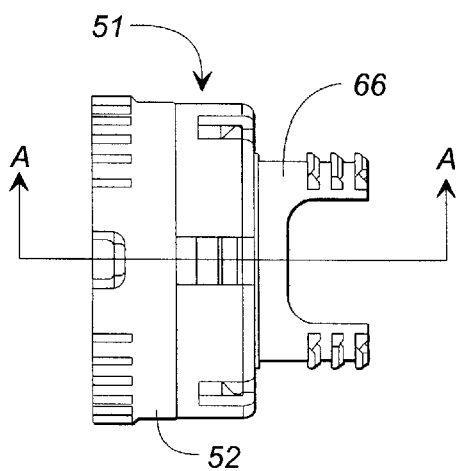
FIG. 10 is a side view of the test tool of FIG. 9 as assembled.
Figure 11:
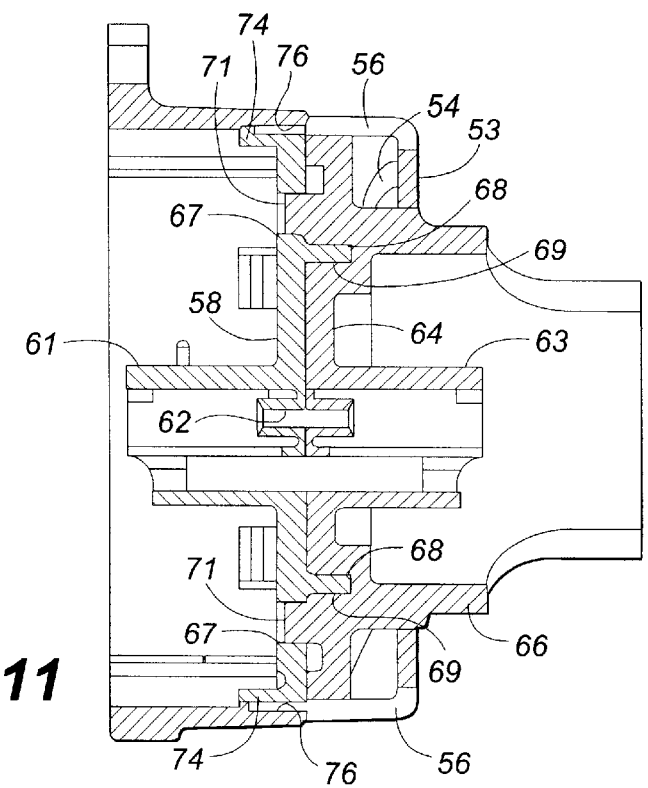
FIG. 11 is a cross-sectional view of the tool along the lines A—A of FIG. 10.

FIG. 9 is an exploded perspective view of the tuning index tool 51 discussed hereinbefore. Tool 51 comprises a hollow circular member 52 having a retaining wall 53 for a warped leaf spring 54. Member 52 has a plurality of openings or windows 56 around the periphery thereof, spaced sixty degrees (60°) apart, and a plurality of keyways 57, only one of which is shown in FIG. 9, which are spaced around the inner periphery of member 52 spaced sixty degrees (60°) apart. With reference to FIG. 11, which is a cross-section of tool 51 along the lines A—A of FIG. 10, member 52 has a wall 58 therein, formed by disc member 59 which has a connector adapter 61 affixed thereto on one side. Extending from the other side of disc 59 is a split sleeve 62, held within adapter 61, for receiving the ferrule of a connector mounted in adapter 61. Sleeve 62 also receives the ferrule of a connector mounted in a second adapter 63 which is affixed to a wall 64 of a movable member 66. Disc member 59 has a circular array of locating holes 67 surrounding a locating ring 68 which seats in a circular groove 69 wall 64 of member 66. As best seen in FIG. 11, wall 64 has extending therefrom six locating projections 71 which are dimensioned to fit within openings or locating holes 67. Holes 67 form a circular array, with the holes spaced sixty degrees (60°) apart, and, importantly, with one of the holes being at zero degrees (0°) relative to the vertical axis of adapter 61. On the other hand, locating projections or pins 71 are in a circular array and spaced sixty degrees (60°) apart, with one projection or pin 71 being at zero degrees (0°) relative to the vertical axis of adapter 63. The outer edge of wall 64 preferably has a locating mark 72 thereon which, as will be apparent hereinafter, is visible through the windows 56 as member 66 is rotated during tests. Preferably locating mark 72 is aligned with the vertical axis of adapter 63 and is, as a consequence, an indicator of the zero degree (0°) location of adapter 63.

Figure 12:
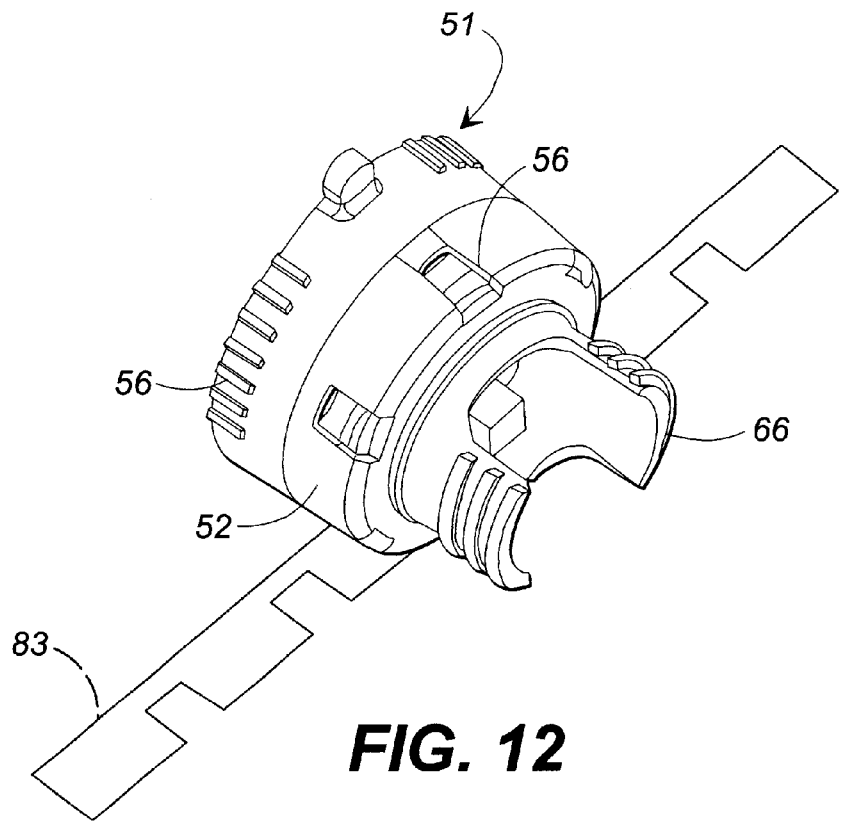
FIG. 12 is a perspective view of the assembled tool.

Tool 51 is assembled by spring 54 being placed within member 52 to bear against retaining wall 53, as seen in FIG. 11. Movable member 66 is then inserted into member 52 so that wall 64 rests against spring 54. Disc member 59, the periphery of which has projecting key 73, is then inserted into member 52 with the key being inserted into keyways 57, and latched therewithin by a plurality of peripherally disposed latching members 74 on member 59 and latching slots 76 within member 52. Sleeve 62 is fitted within the two adapter sleeves, as shown in FIG. 11. The assembled tool 51 is shown in FIGS. 10 and 12, and the tool is use is shown in FIG. 13.

Figure 13:
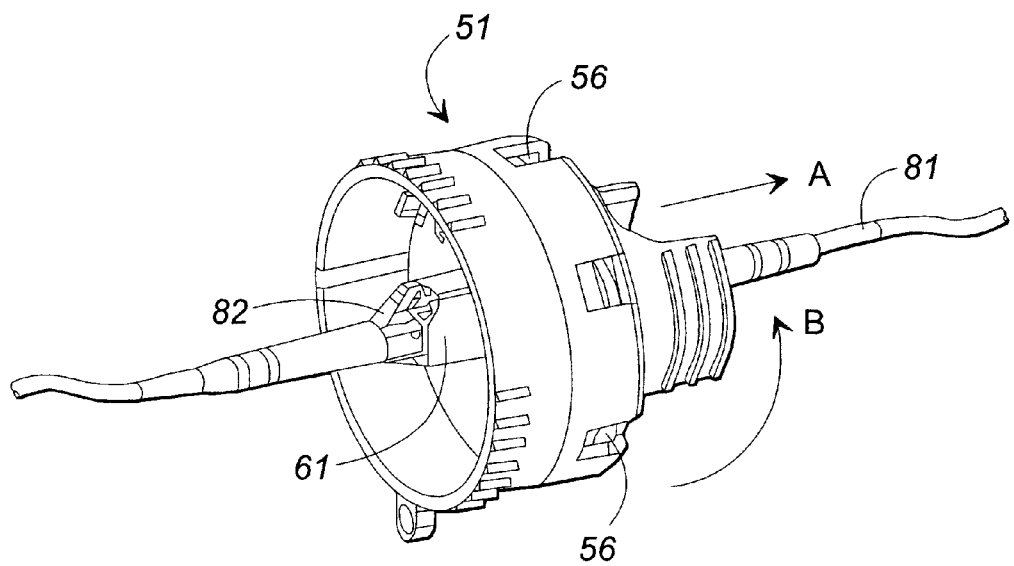
FIG. 13 is a perspective view of the tuning index tool of FIG. 10 as used in performing tuning tests.

In use, as best seen in FIG. 13, a test jumper 81 which terminates in an LC connector, not shown, is inserted into adapter 63. The connector has a known magnitude of offset or eccentricity greater than the connector 82 to be tested for tuning oriented vertically (0°). The orientation can be 180°, which is also vertical, but the following discussion will be directed toward the 0° orientation. Preferably the magnitude of the eccentricity relative to the ferrule axis is 1.8 to 3.5 microns. The connector 82 to be tuned is inserted into adapter 61 and has a unknown amplitude and direction of eccentricity. With marker 72 showing in one of the windows, such as, for example, the 0° orientation window, which may be indicated by a marking strip 83 affixed on the periphery of member 52 (see FIG. 12), insertion loss is measured. The operator then pulls member 66, which is ridged to give purchase, in the direction indicated by arrow A, against spring 54 until the ferrules of the two connectors are disengaged and locating pins 71 are cleared from openings 67. The member 66 is then rotated, for example, clockwise (direction B), until the marker 72 appears in the next window 56, in other words, member 66 is rotated 60°, as is connector 63. Insertion loss is again measured and recorded. The process is repeated for five more incremental rotations, and the measured insertion losses will have a maximum and a minimum. It is noted at which incremental position the insertion loss was the least, for example, it was least at the second rotational position, which is an indication that 120° of rotation resulted in closest alignment of the fiber ends. The connector to be tuned is then removed from the tool. Suitable means, such as the especially designed spanner wrench previously discussed, is then used to rotate the ferrule of the connector 120° counter-clockwise in the manner explained hereinbefore, to "tune" the connector. Inasmuch as the eccentricity vector of the test jumper was vertical (0°) during the test, then the eccentricity vector of the product connector is now also vertical, and the connector junction with the other "tuned", or vertically oriented eccentricity, connecting member, will exhibit the minimum achievable insertion loss for that connection.

The tuning index tool as described and shown in the figures is the subject of U.S. patent application Ser. No. 09/363,908.

Tuning Wrench

As pointed out hereinbefore, after the insertion loss measurements are completed and the eccentricity orientation of the connector determined, the product connector must then be tuned to the indicated orientation. The tuning of the connector is discussed in connection with FIGS. 5a and 5b wherein it is shown that the ferrule 27 is pushed into the connector against the force of spring 29 until the flange 26 clears the flange seating opening 36 sufficiently to allow the ferrule/barrel assembly to be rotated. This movement of the ferrule may be accomplished by any suitable means, such as, for example, needle nose pliers which are used to grip the ferrule and to push it. The ferrule is made of sufficiently hard material, such as a ceramic, that judicious gripping thereof with pliers is generally insufficient to damage the ferrule. It is desirable that the assembly not be pushed so far that the spring 29 bottoms, which can, over time, weaken the spring or even damage it.

Figure 14E:
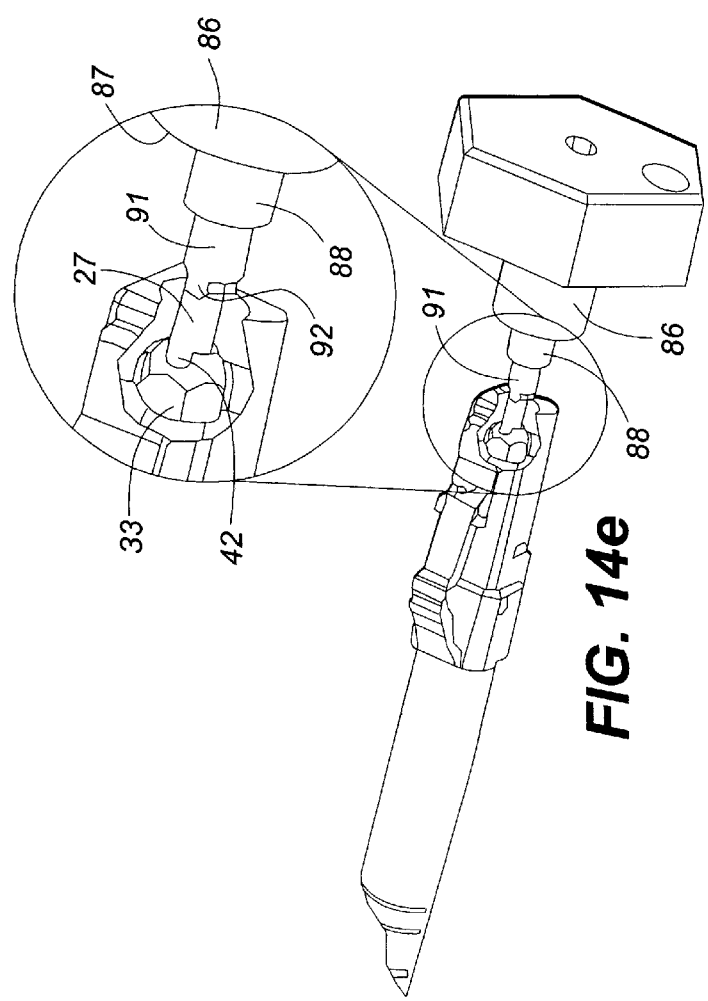
FIG. 14e is a detail of the tuning operation using the wrench of FIG. 14b.
Figure 14F:
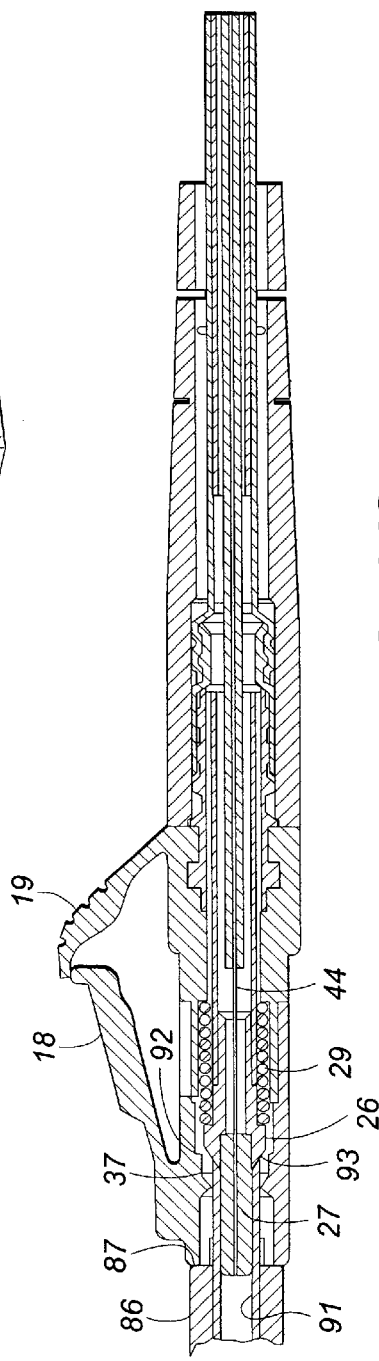
FIG. 14f is a cross-sectional view of the connector of the invention as it is being tuned by the wrench.

FIGS. 14a through 14f there are shown several views of a unique tuning wrench 83 for use with the arrangement of FIG. 4a. Wrench 83 has a first, enlarged, body portion 84 having a hexagonal shape for ease of gripping. It is to be understood that portion 84 can have other shapes besides hexagonal; however, the hexagonal shape makes possible an easy determination of when a 60° rotation has been achieved. Extending from portion 84 is a limiting member 86 having a diameter greater than bore 21 in the front portion of connector 11 and a flat face 87 at its distal end. Extending from face 87 is a strengthening member 88 which has a diameter that is less than the bore 21. A central bore 89 extends through member 84, 86, and 87 as shown. A tubular member 91 is located in bore 89 and affixed thereto. Member 91 is preferably made of metal, although it is not intended that it be restricted thereto, since other materials may be suitable. The distal end of member 91 has first and second tangs 92 and 93, diametrically opposite each other which form a spanner wrench. The inner diameter of member 91 is such that it slides easily over the ferrule 27 of the connector 11, and tool 83 may then be pushed forward to where the tangs 92 and 93 engage slot 42 of the flange member 26. It will be obvious to workers in the art that one tang can be used. FIG. 14e depicts this operation just prior to such engagement, and FIG. 14f depicts ferrule 27 in the disengaged position after tool 83 is pushed forward until face 87 butts against the front of the connector, thereby limiting the distance that the ferrule/barrel assembly is pushed against the spring. The distance that member 91 protrudes from limiting member 86 is sufficient to allow tangs 92 and 93 to engage slot 42, plus a distance after such engagement to incur disengagement of flange member 26, as seen in FIG. 14f, but no more, face 87 blocking any further rearward movement thereof. Body portion 84 preferably has a reference hole 94, located at one of the cusps of the hexagonal shape, and, as seen in FIG. 14b, the plane in which the tangs 92 and 93 lie is normal to the vertical centerline of reference hole 94.

The wrench 83 is primarily intended for use with the tuning index tool 51 and is used to make the incremental rotations of the product connector, the number of increments being indicated by the results of the test process discussed hereinbefore. However, the wrench may also be used to make tuning adjustments in the field to the fully assembled product connector.

The tuning wrench, as hereindescribed, is the subject of U.S. patent application Ser. No. 09/362,203, filed concurrently herewith.

In conclusion of the detailed description, it should be noted that it will be obvious to those skilled in the art that many variations and modifications may be made to the preferred embodiment as shown herein without substantial departure from the principles of the present invention. All such variations and modifications are intended to be included herein as being within the scope of the present invention as set forth in the claims. Further, in the claims hereafter, the corresponding structures, materials, acts, and equivalents of all means or step plus function elements are intended to include any structure, material, or acts for performing the functions without specifically claimed elements.

What is claimed is:

1. A fully assembled tunable optical fiber connector comprising:
   on assembly comprising an elongated tubular member having a ferrule holding member thereon and a ferrule extending from said holding member;
   a housing member having a central bore extending therethrough in which said assembly is located;
   a spring member bearing against a rear surface of said holding member and against the housing for applying a forward biasing force to said assembly;
   characterized in that said holding member has a multi-faceted periphery and is rotatable within said bore; and
   said housing member has a multi-faceted seating area within said bore, the number of facets on the holding member and the seating area being the same.

2. The optical fiber connector as claimed in claim 1 wherein said multifaceted holding member has a tapered front surface and said seating area has a tapered constriction in said bore for receiving said tapered front surface.

3. The optical fiber connector as claimed in claim 2 wherein said tapered front surface has a slot therein.

4. An optical fiber connector as claimed in claim 1 wherein said holding member is hexagonal in shape.

5. The optical fiber connector as claimed in claim 1 wherein said seating area has a hexagonal inner periphery.

6. An optical fiber connector as claimed in claim 1 wherein said multi-faceted periphery comprises a circular shape having a plurality of equally spaced slots therein.

7. An optical fiber connector as claimed in claim 6 wherein there are six slots, spaced sixty degrees (60°) apart.

8. An optical fiber connector as claimed in claim 1 wherein said seating area has a plurality of splines extending toward the central axis and equally spaced about the periphery.

9. An optical fiber connector as claimed in claim 8 wherein there are six splines spaced sixty degrees (60°) part.

10. The optical fiber connector as claimed in claim 1 wherein said holding member has a first longitudinal thickness and said seating area has a second longitudinal thickness, said second thickness being less than said first thickness.

11. The optical fiber connector as claimed in claim 1 wherein the connector is an LC type.

12. A method of tuning an assembled optical fiber connector having a housing and an axially movable assembly which has a multi-faceted ferrule holding member seatable within the housing comprising the steps of:
   mating the connector ferrule in butting relationship with the ferrule of another connector;
   measuring the insertion loss;
   unseating the multi-faceted holding member;
   and rotating it an incremental amount equal to the angle between two adjacent facets then reseating the holding member;
   measuring the insertion loss;
   repeating the step of rotating the holding member until the incremental angles of rotation positions total 360° while measuring the insertion loss at each position;
   determining the angular position at which the insertion loss is a minimum; and
   rotating the assembly to that position.

13. A method of tuning an optical fiber connector as claimed in claim 12 wherein the connector ferrule is mated in butting relationship to a connector ferrule having a known direction of its eccentricity vector.

14. A method of tuning an assembled optical fiber connector having a housing and an axially movable assembly which has a multi-faceted ferrule holding member seatable within the housing comprising the steps of:

mating the connector ferrule in butting relationship with the ferrule of another conductor;

measuring the insertion loss;

unseating the multi-faceted holding member and rotating it an incremental amount equal to the angle between two adjacent facets then reseating the holding member;

measuring the insertion loss;

repeating the step of rotating the holding member until the incremental angles of rotation positions total 360° while measuring the insertion loss at each position;

determining the angular position at which insertion loss is a maximum; and rotating the assembly to a position 180° from the angular position where the loss was a maximum.

15. A method of tuning an optical fiber connector as claimed in claim 14 wherein the connector ferrule is mated in butting relationship to a connector ferrule having a known direction of its eccentricity vector.

* * * * *